United States Patent [19]

Doss et al.

[11] 4,143,000

[45] Mar. 6, 1979

[54] HEAVY RESIDUE FROM HYDROGENATION OF BRANCHED ALIPHATIC DINITRILES FOR CURING EPOXY RESINS

[75] Inventors: Richard C. Doss; Ralph P. Williams, both of Bartlesville, Okla.

[73] Assignee: Phillips Petroleum Company, Bartlesville, Okla.

[21] Appl. No.: 888,726

[22] Filed: Mar. 21, 1978

[51] Int. Cl.$^2$ .............................................. C08G 59/50
[52] U.S. Cl. ............................... 528/123; 260/583 P; 260/583 K; 260/823; 528/421
[58] Field of Search .............. 260/47 EN, 2 N, 583 P, 260/583 K, 59 EP

[56] References Cited

U.S. PATENT DOCUMENTS

| | | | |
|---|---|---|---|
| 3,303,165 | 2/1967 | Wallis et al. | 260/47 |
| 3,519,602 | 7/1970 | Castro et al. | 260/47 |

*Primary Examiner*—Harold D. Anderson
*Assistant Examiner*—E. A. Nielsen

[57] ABSTRACT

A mixture of polyamines obtained as a heavy residue from the distillation of a reaction product from the hydrogenation of branched aliphatic dinitriles is useful as curing agent for epoxy resins showing lowered water absorption and significantly higher lap shear strength.

9 Claims, No Drawings

HEAVY RESIDUE FROM HYDROGENATION OF BRANCHED ALIPHATIC DINITRILES FOR CURING EPOXY RESINS

This invention relates to the curing of epoxy resins. In one of its aspects the invention relates to a curing agent for an epoxy resin. In another of its aspects the invention relates to a curing agent or hardener for epoxy resins to yield cured resins exhibiting exceptionally higher lap shear strength and lower water absorption than at least some prior art cured epoxy resins.

In one of its concepts the invention provides as curing agent or hardener to cure epoxy resins a heavy residue obtained from the distillation of a reaction product obtained upon hydrogenation of branched aliphatic dinitriles containing from 7 to 30 carbon atoms per molecule. In another concept the invention provides a polyamine mixture as curing agent for epoxy resin the mixture containing predominantly components generally corresponding to the formula

$$H_2N-R'+NH-R]_nNH_2$$

wherein the R's are independently selected from branched alkylene radicals of 7 to 30 carbon atoms and where n is an integer having a value in the range 1–5.

It will be understood by one skilled in the art in possession of this disclosure having studied the same that it is to the components of the mixtures that the n value is applied.

The production of improved, cured epoxy resins, widely used, is desirable. Particularly desirable to have a curing agent or hardener for an epoxy resin which will impart to the cured resin considerably lower water absorption and significantly increased lap shear strength.

It has now occurred to us that the heavy residue, herein described, is suitable as a curing agent or hardener for epoxy resins.

It is an object of this invention to produce a cured epxoy resin. It is another object of this invention to provide an improved curing agent or hardener for an epoxy resin. It is a still further object of the invention to provide a curing agent or a hardener which imparts lower water absorption and increased lap shear strength to a resin cured or hardened therewith.

Other aspects, concepts, objects and the several advantages of the invention are apparent from a study of this disclosure and the claims.

According to the present invention there is provided a combination or package containing an epoxy resin and a curing agent or hardener therefor, the latter being obtained as a heavy residue from the distillation of the reaction product obtained upon hydrogenation of branched aliphatic dinitriles containing 7 to 30 carbon atoms per molecule.

In the now preferred form of the invention the heavy residue results from hydrogenation of branched aliphatic dinitriles having 9 to 12 carbon atoms per molecule.

Thus, the polyamine mixtures useful in this invention as curing agents for epoxy resins contain predominantly components generally corresponding to the general formula $H_2N-R'+NH-R]_nNH_2$ wherein the R's are independently selected from branched alkylene radicals of 7 to 30, and preferably 9 to 12, carbon atoms per radical and wherein n generally has the value of from 1 to 5. Said branched alkylene radicals will contain one or more side chains with each side chain being an alkyl radical of one to about six carbon atoms per alkyl radical.

The above-described branched aliphatic dinitriles from which the polyamine mixture of this invention are prepared can be free from olefinic unsaturation or, can contain olefinic unsaturation. Representative examples of olefinically unsaturated branched dinitriles include such compounds as 4-methyl-3-hexenedinitrile, 5-ethyl-4-decenedinitrile, 7-methyl-6-tridecenedinitrile, 7-methyl-6-pentadecenedinitrile, 12-methyl-12-tetracosenedinitrile, 5-methyl-4-nonenedinitrile, 10-hexyl-9-tetracosenedinitrile, 2,3-dimethyl-3-hexenedinitrile, 2,4,6-trimethyl-3-heptenedinitrile, 4-ethyl-6,7-dimethyl-3-octenedinitrile, 2,4,6-triethyl-3-octenedinitrile, 2-ethyl-4,6-dipropyl-3-octenedinitrile, 2-methyl-4,6,8,10-tetrapropyl-3-dodecenedinitrile, 2,4,7,9,11,13,15-heptaethyl-6-hexadecenedinitrile, 3-methylenehexanedinitrile, 4-methyleneheptanedinitrile, 5-methylenenonanedinitrile, 6-methyleneundecanedinitrile, 7-methylenetridecanedinitrile, 8-methylenepentadecanedinitrile, 12-methylenetetracosanedinitrile, 15-methylenenonacosanedinitrile, 2-methyl-3-methylenepentanedinitrile, 2,4-dimethyl-3-methylenepentanedinitrile, 2-methyl-4-methyleneoctanedinitrile, 2-methyl-7-ethyl-4-methyleneoctanedinitrile, 2,4,8-trimethyl-6-methylenedodecanedinitrile, 2,4,8,10-tetrapropyl-6-methylenedodecanedinitrile, 2,26-dimethyl-14-methyleneheptacosanedinitrile, and mixtures thereof. The saturated analogs of the above olefinically unsaturated branched dinitriles are representative examples of branched aliphatic dinitriles free from olefinic unsaturation.

A presently preferred branched-chain unsaturated aliphatic dinitrile feedstock for employment in the preparation of polyamine mixtures for use in this invention is the dinitrile reaction product mixture obtained by the reaction of isobutylene and acrylonitrile. This dinitrile reaction product mixture generally comprises 5-methyl-4-nonenedinitrile, 2,4-dimethyl-4-octenedinitrile, 2,4-dimethyl-3-octenedinitrile, 2,4,6-trimethyl-3-heptenedinitrile, 5-methylenenonanedinitrile, 2-methyl-4-methyleneoctanedinitrile, and 2,6-dimethyl-4-methyleneheptanedinitrile. This preferred unsaturated dinitrile mixture is readily prepared by procedures described in U.S. Pat. Nos. 3,840,583 (Oct. 8, 1974); 3,985,786 (Oct. 12, 1976).

The hydrogenation of the above-described branched aliphatic dinitriles can be conducted as described in U.S. Pat. Nos. 3,880,928 (Apr. 29, 1975), 3,880,929 (Apr. 29, 1975); 3,896,173 (July 22, 1975), 3,896,174 (July 22, 1975); 3,898,286 (Aug. 5, 1975) and others. Separation of the light reaction products, i.e., saturated aliphatic diamines, from the heavy polyamine mixture is accomplished by conventional means, such as fractional distillation. The polyamine mixture useful in this invention is referred to in the above patents pertaining to hydrogenation as "heavies" or "distillation residue".

Exemplary catalysts for the hydrogenation of the branched aliphatic dinitriles include platinum-, palladium-, ruthenium-, rhodium-, cobalt-, and nickel-containing compounds, alone or combinations thereof or in combination with various known promoters. Any of the well-known catalyst supports, such as alumina, can be employed. The hydrogenation can be conducted in a single stage or in a two-stage reaction, in which, if desired, the olefinic unsaturation, should any be present, is hydrogenated under different conditions than the nitrile groups. If desired, the hydrogenation or a portion or stage thereof can be conducted in the presence of a secondary amine suppressant, such as ammonia or tertiary amine.

The hydrogenation of the branched aliphatic dinitriles can be carried out in the temperature range of about 30° C. to about 250° C., preferably in the range of about 70° C. to about 200° C. and in the pressure range of from about 3.5 megapascals to about 35 megapascals and preferably within the range of about 7 megapascals to about 20 megapascals.

The diluent utilized in the hydrogenation process, if desired, is generally selected from the group consisting of alcohols, ethers, hydrocarbons, and mixtures thereof which will adequately dissolve or suspend the branched aliphatic dinitriles to facilitate hydrogenation. Suitable diluents include methanol, ethanol, 2-propanol, 2-methyl-2-propanol, 2-butanol, 1-hexanol, diethyl ether, 1,4-dioxane, tetrahydrofuran, n-hexane, n-heptane, 2,2,4-trimethylpentane, cyclohexane, and mixtures thereof. To facilitate hydrogenation and handling of the reaction mixtures, the diluents will generally be employed in amounts ranging from 2/1–20/1 and preferably 5/1–12/1 parts by weight of diluent per part by weight of branched aliphatic dinitriles.

The heavy polyamine mixture employed as a curing agent or hardener in the present invention is separated from the hydrogenation reaction mixture by conventional means, such as filtration to remove catalyst particles, followed by evaporation or fractional distillation of volatile materials thus leaving a heavy mixture of polyamine compounds.

Cured epoxy resins are well known in the art to be prepared by the reaction of epoxy resins with curing or hardening agents. The epoxy resins generally contain 2 or more oxirane rings

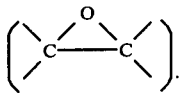

Oxirane rings are under a great strain and will open easily through chemical means. A variety of compounds, possessing active hydrogen atoms, for example, amines, acids, phenols, alcohols, and thiols, are capable of opening the ring and forming a larger molecule which in turn reacts with another oxirane starting a repetitive process which lasts until a hard, tough material forms. These compounds containing active hydrogen atoms are called curing or hardening agents. The hard, tough materials are termed "cured" or "hardened". In general, these cured products are characterized by good mechanical and high temperature strength, good heat and chemical resistance, and by outstanding ability to adhere to a wide range of substrates. The term "epoxy resin" is here defined to mean the monomer or prepolymer bearing oxirane end groups, wherein said epoxide end groups are to be subsequently involved in reactions with the active hydrogen-bearing curing agent. The term "cured epoxy resin" applies to the cured polymer. Many different epoxy resins are available and can be used in the practice of this invention. Three resin types which are commercially important are listed as follows:

A. Diglycidyl ether of bisphenol A resin (generally called bisphenol A-epichlorohydrin resins, which are the most widely used epoxies);
B. Epoxy-novolacs (more accurately, glycidylated novolac resins); and
C. Cycloaliphatic epoxy resins.

Cured epoxy resins are well known in the art for a wide range of substrates to which they are applicable. Metals, wood, concrete, polyolefins, and essentially any solid substrate are included. The nature of the curing agent or hardener strongly influences both the conditions requisite for curing and also the properties of the resulting cured epoxy resin.

The curing agent or hardener employed in the cured epoxy resins of this invention is a mixture of polyamines obtained as a heavy residue from the distillation of the reaction product from the hydrogenation of branched aliphatic dinitriles containing from 7 to 30 carbon atoms per molecule and preferably 9 to 12 carbon atoms per molecule.

The polyamine curing agent and the epoxy resins of this invention are generally combined in amounts ranging from 1/0.75 to about 1/1.25, and preferably 1/0.9 to 1/1.1, equivalents of active hydrogen to equivalents of oxirane ring.

It is within the scope of this invention to employ whatever accelerators, diluents, pigments, fillers, etc., which are desired in the preparation of the inventive cured epoxy resin. Amounts thereof will vary widely depending upon the particular use intended and are within the knowledge of one skilled in the art.

EXAMPLE

The polyamine mixture described hereinafter as being employed as a curing agent for epoxy resin was prepared in a sequence of steps which involved the reaction of isobutylene and acrylonitrile to produce a mixture of olefinically unsaturated dinitriles which were subsequently recovered by fractional distillation, hydrogenation of the dinitrile mixture and subsequent distillation of the reaction product to separate volatile diamine products from the desired heavy polyamine mixture.

A solution of acrylonitrile (one part by weight), isobutylene (2 parts by weight), a monoadduct reaction product of isobutylene and acrylonitrile (as described in U.S. Pat. No. 3,985,786 and containing predominantly 5-methyl-5-hexenenitrile and 2,4-dimethyl-4-pentenenitrile; 2 parts by weight), and water (0.25 part by weight) was continuously added to a 19 liter reactor at 270° C.–280° C. and 17 megapascals. Residence time in the reactor of 0.6 to 0.7 hours resulted in about 50 percent of the acrylonitrile being converted to products.

Effluent from the above-described reactor was fractionally distilled to separate unreacted starting materials for recycle and products, including a diadduct reaction product mixture (as described in U.S. Pat. No. 3,985,786 and containing predominantly 5-methylene-1,9-nonanedinitrile and 5-methyl-4-nonenedinitrile and minor amounts of other isomers, diadduct product mixture represents about 85 percent by weight of total products) and a heavy distillation residue (about 15 percent by weight of total products).

The above-described diadduct product mixture was hydrogenated in a 2-stage continuous hydrogenation system employing two tubular reactors (the first 5.1 cm diameter × 2.45 m length and the second 5.1 cm diameter × 3.05 m length) connected in series. The first reactor contained 4.7 kg of 0.5 weight percent palladium on alumina, while the second reactor contained 5.0 kg of 0.5 weight percent ruthenium on alumina. A solution of the diadduct reaction product (0.454 kg/hr) and tert-butyl alcohol (3.68 kg/hr) was pumped through the reactors in the presence of one scfm (standard cubic feet per minute) of hydrogen. Ammonia (0.68 kg/hr) was added to the stream between the first and second reactors. The reactors were maintained at 11 megapascals and 100° C. for the first reactor and 10.3 megapascals and 121° C. for the second reactor. The resultant reaction mixture was fractionally distilled to remove solvent and volatile product (mixture containing predominantly 5-methyl-1,9-nonanediamine and other isomers in minor amounts). The remaining heavy distillation residue was a viscous, amber-colored liquid mixture of polyamines (10.4 percent by weight based on total products).

The resulting heavy polyamine mixture was determined to have an average molecular weight of 393 (by vapor pressure osmometry) and an average of 3.2 equivalents of nitrogen per mole (by titration with 0.1 N HCl). Analysis of the polyamine mixture by infrared and nuclear magnetic resonance spectroscopy revealed that the mixture contained predominantly compounds of general formula

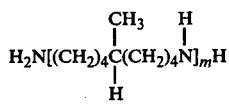

and minor amounts of other isomers. Of the total polyamine mixture, approximately 70 percent by weight corresponded to the above formula with M=2. The remaining approximately 30 weight percent corresponded to the above formula with M=3 and 4 and minor amounts of other isomers and higher oligomers.

The thus-obtained polyamine mixture was employed as a curing agent for a commerically available epoxy resin (Epon 828 from Shell Chemical Co.). The following inventive runs 1–4 employed epoxy resin and various amounts of the polyamine mixture. Run 5 employed a commercially available polyamine curing agent, triethylenetetraamine, with the epoxy resin. The epoxy resin and curing agents were combined in proportions given in Table I, mixed by hand, degassed and used to bond 2.5 cm × 10 cm aluminum coupons (previously degreased and sandblasted). Additional epoxy resin/curing agent composition was placed in aluminum cups to prepare specimens for water absorption tests. The compositions and laminates were allowed to stand for 4 hours at 25° C., then 16 hours at 150° C. to effect curing. The laminates were then aged an additional 7 days at 25° C. prior to testing. Lap shear strengths measured on the bonded coupons and water absorption measured on the pieces of cured epoxy resin are reported in Table I.

Table I

| Run No. | Epoxy, gm | Polyamine, gm | Water Absorption, %[a] | Lap Shear Strength psi[b], 25C | |
|---|---|---|---|---|---|
| | | | | Before | After |
| 1 (Inv.) | 10 | 4.5 | 0.21 | 2500 | 2040 |
| 2 (Inv.) | 10 | 3.5 | 0.23 | 3100 | 2000 |
| 3 (Inv.) | 10 | 2.5 | 0.26 | 2900 | 1930 |
| 4 (Inv.) | 10 | 1.5 | 0.31 | 3030 | 1890 |

Table I-continued

| Run No. | Epoxy, gm | Polyamine, gm | Water Absorption, %[a] | Lap Shear Strength psi[b], 25C | |
|---|---|---|---|---|---|
| | | | | Before | After |
| 5 (Comp.) | 10 | 1.3[c] | 0.37 | 1720 | 1280 |

[a]Measured as percent increase in weight after soaking in water for 7 days at 25° C (ASTM-D590).
[b]Measured on Instron instrument at 0.05 in/min crosshead speed. "Before" refers to original laminate. "After" refers to measured value after 24 hours exposure to boiling water.
[c]Triethylenetetraamine.

The data in Table I show that the inventive cured epoxy resins (runs 1–4) exhibit significantly less absorption of water than the prior art cured epoxy resin of run 5 and also considerably higher lap shear strength than the comparative run both before and after soaking in boiling water.

Reasonable variation and modification are possible within the scope of the foregoing disclosure and the appended claims to the invention the essence of which is that a heavy residue obtained in the distillation of a reaction product from hydrogenation of branched aliphatic dinitriles containing from 7 to 30 carbon atoms per molecule, e.g., a mixture of polyamies have been found to give lower water absorption and higher lap shear strength than some prior art epoxy resins.

We claim:

1. A package containing an epoxy resin and a curing agent therefor said curing agent being a mixture of polyamines obtained as a heavy residue from the distillation of the reaction product from the hydrogenation of branched aliphatic dinitriles containing 7 to 30 carbon atoms per molecule.

2. A package according to claim 1 wherein the polyamine mixture contains predominantly components generally corresponding to the general formula $H_2N-R'-[NH-R']_n NH_2$ wherein the R's are independently selected from branched alkylene radicals having 7 to 30 carbon atoms and n is an integer generally having a value in the range 1–5.

3. A package according to claim 1 wherein the polyamine mixture contains predominantly components generally corresponding to the general formula $H_2N-R'-[NH-R']_n NH_2$ wherein the R's are independently selected from branched alkylene radicals having 9 to 12 carbon atoms and where n is an integer having a value in the range 1–5.

4. A method for curing an epoxy resin which comprises admixing the same with a curing agent or hardener therefor said agent being a mixture of polyamines obtained as a heavy residue from the distillation of a reaction product from the hydrogenation of branched aliphatic dinitriles containing 7 to 30 carbon atoms per molecule.

5. A method according to claim 4 wherein the polyamine mixture contains predominantly components generally corresponding to the general formula $H_2N-R'-[NH-R']_n NH_2$ wherein the R's are independently selected from branched alkylene radicals of 7 to 30 carbon atoms and where n is an integer having a value in the range 1–5.

6. A method according to claim 5 wherein the branched alkylene radicals have 9 to 12 carbon atoms.

7. A cured epoxy resin, said resin having been cured with a curing agent or hardener obtained as a mixture of polyamines comprised in a heavy residue from the distillation of the reaction product from the hydrogenation of branched aliphatic dinitriles containing 7 to 30 carbon atoms per molecule.

8. A cured resin according to claim 7 wherein the polyamine mixture contains predominantly components generally corresponding to the general formula $H_2N-R'-[NH-R']_n NH_2$ wherein the R's are independently selected from branched alkylene radicals of 7 to 30 carbon atoms and n is an integer having a value in the range 1–5.

9. A cured resin according to claim 8 wherein the alkylene radicals have 9 to 12 carbon atoms.

* * * * *